Figure 1:
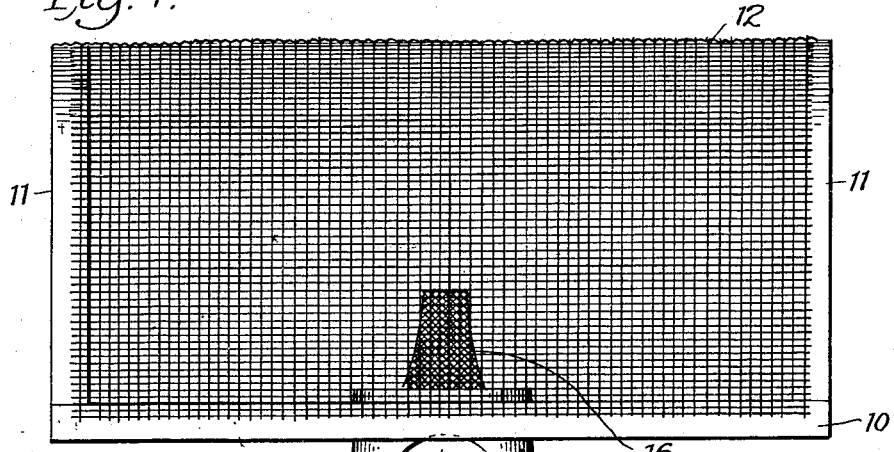

July 8, 1930.  B. WARDEN  1,770,330

ROACH TRAP

Filed July 10, 1929

INVENTOR.

Buford Warden

BY

ATTORNEY.

Patented July 8, 1930

1,770,330

UNITED STATES PATENT OFFICE

BUFORD WARDEN, OF MEMPHIS, TENNESSEE

ROACH TRAP

Application filed July 10, 1929. Serial No. 377,221.

My said invention relates to an insect trap intended primarily for use against roaches, though not necessarily limited to such use. It is an object of my invention to provide a simple and effective trap which can easily be taken apart for purposes of cleaning and the like, which is so constructed as to show whether any insects have been entrapped therein, which is constructed in a manner to facilitate killing of the insects before removal from the trap, and which in other respects is highly economical and efficient.

Figure 2:
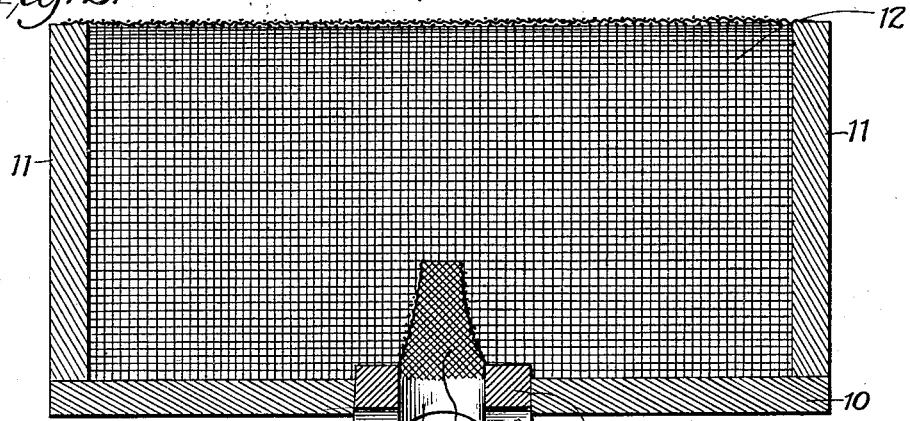
Figure 3:
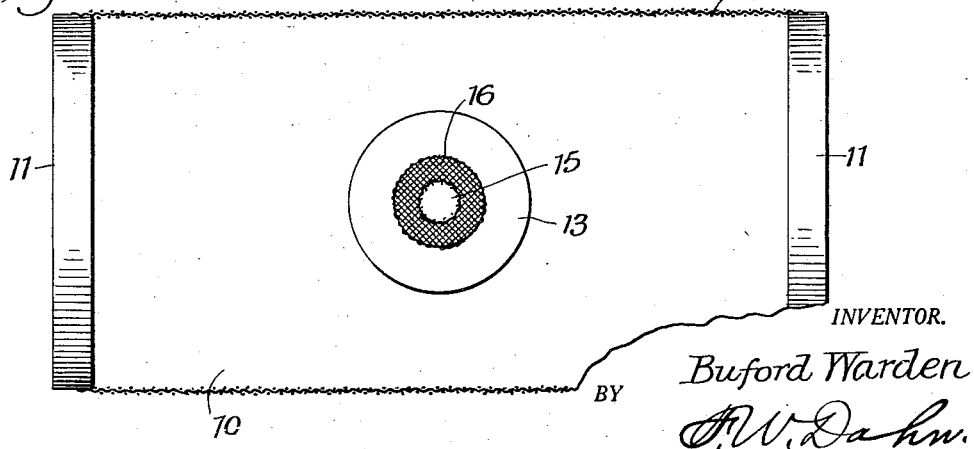

Referring to the drawings, which are made a part of this application and in which similar reference characters indicate similar parts:

Fig. 1, is a side elevation of my device,

Fig. 2, a central longitudinal section of the same, and Fig. 3, a plan view, partly in section.

In the drawings reference character 10 indicates the bottom or base of the trap to which are attached end pieces 11, 11, these end pieces being rounded at the top so as to permit ready application of a piece of screen material 12 which is or may be attached to opposite sides of the base member 10 at the lower ends of the part 12 and is attached at its ends to the end parts 11 in any convenient or desirable manner, this screen member being readily fitted over the end members by reason of their rounded form at the upper end thereof and serving to permit the user to see the interior of the trap while also serving to permit ready killing of insects contained therein, as by pouring boiling water on the trap or by immersing it in boiling water so far as necessary.

Preferably the bottom member 10 is held up off the floor or other supporting surface and with this end in view I provide a circular central support 13 this support being here shown as having radiating passage ways or entrances 14 leading to a central opening in the member 13, which opening is indicated at 15 and preferably extends vertically upward.

It will be noted that the slight elevation of the base member 10 provides an attractive refuge for roaches, which generally hide in cracks in the floor or near it. The passages 14 are similarly well adapted to attract their attention, they being low and narrow.

The frusto-conical part 16 is made preferably of screen material and is frictonally held in the central passage of the support 13. The frusto-conical member is open at or near the top and preferably the opening is but little larger than is required to admit the insect. Screen material is preferred because it permits the insects in the passage 15 both to see and otherwise apprehend the presence of bait in the trap. The support 13 is frictionally engaged with the opening in the base 10 so as to permit ready separation of the support and the base and the tube 16 is frictionally held in the support 13 for similar reasons. Obviously other methods of holding these parts in place without permanently securing them together could be utilized without departing from my invention, the object in mind being to render the parts readily separable, as for removal of insects and for cleaning the interior of the trap.

It will be obvious to those skilled in the art that various modifications may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. An insect trap comprising a relatively large flat bottom member having a centrally located hole therein, a relatively small support fitting in said hole and holding said bottom member away from a floor or the like to provide a lurking place for insects, an upward passage in the support, and radial passages in the support communicating with the upright passage the height of said radial passages being approximately equal to the elevation of the bottom member above the floor, substantially as set forth.

2. A device as in claim 1, combined with a tubular screen member forming a continuation of said passage and extending to a substantial distance above the floor of the trap said central support being frictionally held in said bottom member whereby the support and the tubular screen can readily be removed to permit access to the interior of the trap, substantially as set forth.

3. A device as in claim 1, combined with a tubular screen member forming a continuation of said passage and extending to a substantial distance above the floor of the trap said central support being frictionally held in said bottom member whereby the support and the tubular screen can readily be removed to permit access to the interior of the trap said tubular screen fitting frictionally in a hole in the central support for ready removal therefrom, substantially as set forth.

In testimony whereof I affix my signature.

BUFORD WARDEN.